(12) United States Patent
Abdo et al.

(10) Patent No.: US 6,409,939 B1
(45) Date of Patent: Jun. 25, 2002

(54) METHOD FOR PRODUCING A HYDROGEN-RICH FUEL STREAM

(75) Inventors: Suheil F. Abdo, Lincolnshire; Cynthia A. DeBoy, Naperville; Geralyn F. Schroeder, Roselle, all of IL (US)

(73) Assignee: UOP LLC, Des Plaines, IL (US)

( * ) Notice: Subject to any disclaimer, the term of this patent is extended or adjusted under 35 U.S.C. 154(b) by 56 days.

(21) Appl. No.: 09/583,618

(22) Filed: May 31, 2000

(51) Int. Cl.$^7$ .............................. C07C 1/02; C10K 1/02
(52) U.S. Cl. ................. 252/373; 423/648.1; 423/418.2; 423/651; 429/17
(58) Field of Search .............................. 423/437.2, 650, 423/651, 652, 655, 656, 246, 247, 418.2, 648.1; 429/13, 17; 252/373

(56) References Cited

U.S. PATENT DOCUMENTS

| | | | |
|---|---|---|---|
| 2,620,314 A | 12/1952 | Hoekstra | 252/448 |
| 3,631,073 A | 12/1971 | Cohn et al. | 252/373 |
| 4,522,894 A | 6/1985 | Hwang et al. | 429/17 |
| 5,441,581 A | * 8/1995 | Van den Sype et al. | 148/634 |
| 5,494,568 A | 2/1996 | Simpson et al. | 208/46 |
| 5,637,259 A | * 6/1997 | Galuszka et al. | 252/373 |
| 5,861,137 A | * 1/1999 | Edlund | 423/652 |
| 5,922,487 A | 7/1999 | Watanabe et al. | 429/44 |
| 6,007,934 A | 12/1999 | Auer et al. | 429/44 |
| 6,010,675 A | 1/2000 | Trocciola et al. | 423/427 |
| 6,090,312 A | * 7/2000 | Ziaka et al. | 252/373 |

FOREIGN PATENT DOCUMENTS

| | | |
|---|---|---|
| EP | 0 955 351 | 10/1999 |
| JP | 8295503 | 11/1996 |

OTHER PUBLICATIONS

Article Will Developing Countries Spur Fuel Cell Surge? by Rajindar Singh, *Chemical Engineering Progress*, Mar. 1999, pp. 59–66.

Article "Purifying Hydrogen by . . . Selective Oxidation of Carbon Monoxide" by Marion L. Brown, Jr. et al, *Industrial and Engineering Chemistry*, vol. 52, No. 10, Oct. 1960, pp. 841–844.

Article "Advanced PEFC Development for Fuel Cell Powered Vehicles" by Shigeyuki Kawatsu, *Journal of Power Sources* 71 (1998), pp. 150–155.

* cited by examiner

*Primary Examiner*—Steven P. Griffin
*Assistant Examiner*—Edward M. Johnson
(74) *Attorney, Agent, or Firm*—John J. Tolomei; Frank S. Molinaro; Mark Goldberg

(57) ABSTRACT

Disclosed is a hydrogen generation process for use with fuel cells which includes a preferential oxidation step to reduce the concentration of carbon monoxide. The preferential oxidation step includes contacting a fuel stream comprising hydrogen and carbon monoxide in the presence of an oxygen at a preferential oxidation temperature of between about 70° and about 160° C. with preferential oxidation catalyst for reducing the concentration of carbon monoxide to produce a treated fuel gas stream comprising less than about 50 ppm-vol carbon monoxide. The preferential oxidation catalyst comprises ruthenium metal dispersed on a shaped alumina carrier, wherein at least 60 percent of the ruthenium metal is present in a band extending from the surface towards the center and having a width of about 50 percent of the distance from the surface to the center of the shaped alumina carrier. Superior performance at low preferential oxidation temperatures below 130° C. was observed when the band comprised 50 percent of the alumina carrier and contained at least 60 percent of the ruthenium metal. The preferential oxidation catalyst may be employed to reduce carbon monoxide in fuel gas streams supplied to fuel cells wherein carbon monoxide will poison the active noble metal membrane and higher preferential oxidation temperatures may reduce the hydrogen content of the gas stream.

10 Claims, 1 Drawing Sheet

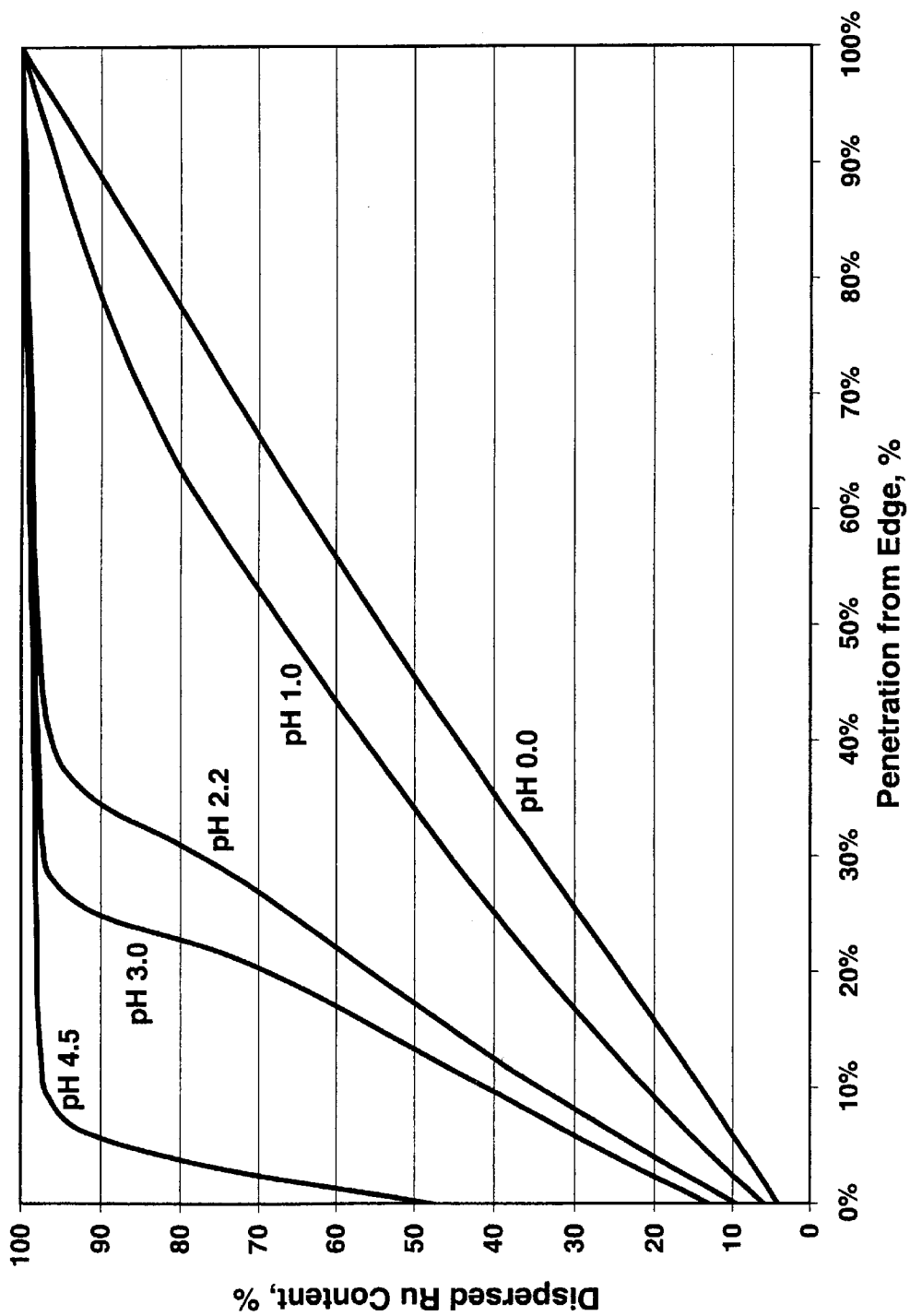

METHOD FOR PRODUCING A HYDROGEN-RICH FUEL STREAM

FIELD OF THE INVENTION

The present invention relates to a method of producing a catalyst and the use of the catalyst in the selective oxidation of carbon monoxide. More particularly, the present invention relates to a method of producing a catalyst and the use of the catalyst in a process for the catalytic preferential oxidation of carbon monoxide in a fuel gas stream prior to the use of the fuel gas stream in a fuel cell.

BACKGROUND OF THE INVENTION

Fuel cells are in principle batteries in which the energy obtained from the reaction of a fuel stream comprising hydrogen and oxygen is converted directly into electrical energy. The present invention describes the preparation of catalysts for preparation of the fuel gas stream for use in fuel cells, in particular for PEM (polymer electrode membrane) fuel cells. This type of fuel cell is becoming increasingly important, due to its high energy density and robust structure, for use in the vehicle industry, i.e. for providing electro-traction in motor vehicles.

The advantages of a vehicle powered by fuel cells are the very low emissions and the high degree of efficiency of the total system compared with conventional internal combustion engines. When hydrogen is the major component in the fuel gas, the primary emission product of the conversion in the fuel cell is water. The water is produced on the cathode side of the fuel cell. The vehicle is then a so-called ZEV (zero emission vehicle). The use of hydrogen in fuel cells requires that hydrogen be available on the anode side of the fuel cell membrane to actually generate power. The source of the hydrogen can be stationary or mobile. Stationary sources of hydrogen will require a distribution and dispensing system like motor gasoline. Mobile sources for hydrogen will include on-board hydrogen generators for the conversion of hydrocarbon fuels to hydrogen. However, hydrogen presents many handling and distribution problems which will not be resolved before the fuel cell powered vehicles reach the market. The infrastructure for the widespread distribution of hydrogen is still too expensive at the moment and there are other problems with the storage and refueling of vehicles. For this reason, the alternative, producing hydrogen directly on board the vehicle by reforming hydrocarbon fuels or oxygenated fuels is growing in importance. For example, methanol can be stored in a fuel tank of the vehicle and on demand converted by a steam reforming process at 200° to 300° C. to a hydrogen-rich fuel gas with carbon dioxide and carbon monoxide as secondary constituents. After converting the carbon monoxide by a shift reaction, preferential oxidation (prefox) or another purification process, this fuel gas, or reformate gas is supplied directly to the anode side of the PEM fuel cell. Theoretically, the reformate gas consists of 75 volume percent hydrogen and 25 volume percent carbon dioxide. In practice, however, the reformate gas also will contain nitrogen, oxygen and, depending on the degree of purity, varying amounts of carbon monoxide (up to 1 volume percent).

The PEM fuel cell comprises layers of catalyst comprising platinum and platinum alloys on the anode and cathode sides of PEM fuel cells. These catalyst layers consist of fine, noble metal particles which are deposited onto a conductive support material (generally carbon black or graphite). The concentration of noble metal is between 10 and 40 weight percent and the proportion of conductive support material is thus between 60 and 90 weight percent. The crystallite size of the particles, determined by X-ray diffraction (XRD), is about 2 to 10 nm. Traditional platinum catalysts are very sensitive to poisoning by carbon monoxide; therefore the CO content of the fuel gas must be lowered to <100 ppm in order to prevent power loss in the fuel cells resulting from poisoning of the anode catalyst. Because the PEM fuel cell operates at a relatively low operating temperature of between 70° and about 100° C., the catalyst is especially sensitive to CO poisoning.

Processes for the production of synthesis gas are well known and generally comprise steam reforming, autothermal reforming, non-catalytic partial oxidation of light hydrocarbons or non-catalytic partial oxidation of any hydrocarbons. Of these methods, steam reforming is generally used to produce synthesis gas for conversion into ammonia or methanol. In such a process, molecules of hydrocarbons are broken down to produce a hydrogen-rich gas stream. A paper titled "Will Developing Countries Spur Fuel Cell Surge?" by Rajindar Singh, which appeared in the March 1999 issue of *Chemical Engineering Progress*, page 59–66, presents a discussion of the developments of the fuel cell and methods for producing hydrogen for use with fuel cells and highlights one hybrid process which combines partial oxidation and steam reforming in a single reaction zone as disclosed in U.S. Pat. No. 4,522,894 which is hereby incorporated by reference.

U.S. Pat. No. 5,922,487 discloses an anode electrocatalyst for a fuel cell which depresses the poisoning of the noble metal fuel cell membrane. The anode electrocatalyst comprises an alloy essentially consisting of at least one of tin, germanium, and molybdenum, and one or more noble metals selected from platinum, palladium, and ruthenium.

U.S. Pat. No. 6,007,934 is concerned with the preparation of supported catalysts based on platinum and ruthenium disposed on the anode side of a PEM fuel cell which have a high resistance to poisoning by carbon monoxide. Carbon monoxide concentrations of more than 100 ppm in the reformate gas should be possible to employ in the fuel gas passed to the fuel cell without a noticeable drop in performance of the PEM fuel cell.

U.S. Pat. No. 6,010,675 discloses a method and apparatus for removing carbon monoxide from a fuel gas prior to use of the fuel gas in a fuel cell for the production of electric power. Catalysts for purifying hydrogen by selective oxidation of carbon monoxide using alumina supported platinum are disclosed in an article entitled "Purifying Hydrogen by . . . Selective Oxidation of Carbon Monoxide" by Marion L. Brown, Jr. et al, *Industrial and Engineering Chemistry*, Vol. 52, No. Oct. 10, 1960, pp. 841–844. U.S. Pat. No. 6,010,675 discloses the problem of using a conventional preferential oxidation catalyst system in a hydrogen generator or fuel processor for producing a fuel gas stream for use in a fuel cell. The above mentioned article at page 842–3 indicated that the selective removal of carbon monoxide was feasible only within a certain temperature zone for all known selective oxidation catalysts with or without variation of the oxygen concentration, below which the oxygen reaction falls off. The critical temperature range for the effective preferential oxidation was identified as being above 130° C. (266° F.) and below 160° C. (320° F.). U.S. Pat. No. 6,010,675 and the above mentioned article are hereby incorporated by reference. The article stated that this narrow range of selectivity applied to a wide range of precious metal catalysts supported on aluminum oxide.

An article entitled "Advanced PEFC Development For Fuel Cell Powered Vehicles", by Shigeyuki Kawatsu, published in the *Journal of Power Sources, Volume* 71 (1998), pages 150–155, discloses that a ruthenium catalyst on alumina was found to be useful for reducing the carbon monoxide concentrations of reformed gas from methanol reforming over a wider operating temperature range than platinum based oxidation catalysts. Significant carbon monoxide conversion activity between about 100° and about 160° C. was disclosed.

EP-0955351A1 discloses a CO-selective oxidation catalyst having metals including platinum and ruthenium disposed on an alumina carrier. The catalyst preparations included ruthenium metals on alumina pellets with ruthenium metal loadings up to 1.0 weight percent.

EP-0955351A1 discloses that the active temperature range for ruthenium was about 160° to 180° C., and only when platinum was either alloyed with the ruthenium or when platinum was included on the alumina carrier was a desired active temperature below 160° C. achieved.

In order to achieve a balance between the reforming reaction zone and the high and low temperature water gas shift reaction zones of fuel processors, others have attempted to dispose these reaction zone in intimate thermal contact to minimize overall energy use. The addition of a preferential or selective oxidation zone to such an integrated system wherein the preferential oxidation catalyst requires effective operating conditions above the outlet conditions of the low temperature water, gas shift reaction and above the temperature of the fuel cell operation creates a difficult engineering problem. On the reaction side, the increased temperature may result in hydrogen loss, and on the engineering side, heating the effluent form the water gas shift reaction zone to the favorable temperature range of the selective oxidation reaction and then cooling the selective oxidation effluent requires increased mechanical complexity, and increased equipment cost.

An object of the present invention is to provide preferential oxidation catalysts which have an improved conversion of carbon monoxide. It is an objective of the present invention to provide a preferential oxidation catalyst which operates effectively at conditions which are more favorable in reducing the carbon monoxide concentration in the fuel gas in fuel cell systems. It is an objective of the present invention to provide and, in particular, to achieve effluent concentrations of carbon monoxide of less than about 50 ppm-vol. Another object of the present invention is to provide a method of producing stable catalysts suitable for the selective conversion of carbon monoxide while maintaining a reasonably high selectivity to the production of carbon dioxide without regeneration.

SUMMARY OF THE INVENTION

The present invention relates to a process for the production of a fuel gas for use in a fuel cell which is sensitive, and in fact, is poisoned by the presence of carbon monoxide in the fuel gas. The fuel gas is a hydrogen-rich stream resulting from the conversion of a hydrocarbon or an oxygenate to produce a synthesis gas which may contain up to about 2 mole percent carbon monoxide. Previously known catalysts for purification of hydrogen streams required more severe conditions than are present in fuel processors or than could be accommodated in a compact fuel processor and fuel cell arrangements. The problem solved by the present invention is a more active preferential catalyst which can reduce the concentration of carbon monoxide in the prefox effluent to less than about 50 ppm-vol at preferential oxidation conditions consistent with the operation of the fuel cell. More specifically, the preferential oxidation catalyst, or prefox catalyst, of the present invention effectively reduces the carbon monoxide in a hydrogen-rich fuel gas to concentration levels below 50 ppm-vol, at a wide range of preferential temperatures including temperatures below 180° C., and particularly below 160° C. Preferably, the wide range of preferential oxidation temperatures includes temperatures between about 70° and about 130° C. The catalyst of the present invention was found to provide effective reduction of carbon monoxide from hydrogen-rich streams. It was surprisingly discovered that by using the method of the present invention to disperse active metal on the surface of a catalyst carrier, a stable and active preferential oxidation catalyst is obtained.

In one embodiment, the present invention relates to a process for the generation of a hydrogen-rich fuel gas stream for use in a fuel cell for the generation of electric power. The process comprising passing a feed stream comprising a hydrocarbon or an oxygenate to a fuel processor. The fuel processor comprises an integrated reforming and water gas shift conversion zone to produce a fuel stream. The fuel stream comprises hydrogen, carbon monoxide, carbon dioxide, and water. The fuel stream at an effective oxidation temperature of between about 70° and about 160° C. and in the presence of an oxygen-containing stream is passed to a preferential oxidation zone. The preferential oxidation zone contains a preferential oxidation catalyst to produce the hydrogen-rich fuel gas stream comprising less than about 50 ppm-vol carbon monoxide. The preferential oxidation catalyst comprises ruthenium metal dispersed on a shaped alumina carrier, at least 60 percent of the ruthenium metal being present in a band extending from the surface towards the center and having a width of about 50 percent of the distance from the surface to the center of the shaped alumina carrier. The hydrogen-rich fuel gas stream is passed to a fuel cell for the generation of electric power and electric power is withdrawn.

In another embodiment, the present invention relates to a method for preparing a preferential oxidation catalyst to reduce the concentration of carbon monoxide in a hydrogen-rich fuel gas stream produced by a fuel processor for a fuel cell to generate electric power. The method for preparing the preferential oxidation-catalyst composition comprises contacting a shaped alumina carrier with a source of ruthenium metal comprising ruthenium nitrosyl nitrate at a pH of between about 1.0 and about 4.5 to provide a ruthenium-containing composition. The ruthenium-containing composition has a ruthenium metal content of between about 0.5 and about 3 weight percent of the catalyst as ruthenium metal dispersed on a shaped alumina carrier, at least 60 percent of the ruthenium metal being present in a band extending from the surface towards the center and having a width of about 50 percent of the distance from the surface to the center of the shaped alumina carrier. The ruthenium containing composition is reduced to provide the preferential oxidation catalyst.

In a further embodiment, the present invention relates to a preferential oxidation process for the conversion of carbon monoxide. This process comprises passing a fuel stream comprising hydrogen, carbon monoxide, carbon dioxide and water in the presence of an oxygen-containing stream at oxidation conditions including a preferential oxidation temperature between about 70° and about 160° C. to a reaction zone. The reaction zone contains a preferential oxidation catalyst which comprises ruthenium metal dispersed on a shaped alumina carrier, at least 60 percent of the ruthenium metal being present in a band extending from the surface towards the center and having a width of about 50 percent of the distance from the surface to the center of the shaped alumina carrier. A treated fuel stream comprising less than about 50 ppm-vol carbon monoxide is withdrawn from the preferential oxidation process.

BRIEF DESCRIPTION OF THE DRAWING

The FIGURE depicts ruthenium distribution in the ruthenium-containing preferential catalyst of the present invention.

DETAILED DESCRIPTION OF THE INVENTION

Generally, the feedstock to a preferential oxidation process using the catalyst of the present invention will comprise hydrogen, nitrogen, carbon monoxide, carbon dioxide, water, and light hydrocarbons and is typically derived from a combination of reforming and water gas shift reaction step. Some sulfur compounds including hydrogen sulfide and mercaptans may be present. The removal of sulfur from the hydrocarbon feedstock may be accomplished prior to the reforming and water gas shift steps by any conventional means including adsorption, chemisorption, and catalytic desulfurization. For compact fuel processors used with fuel cells, chemisorption with a material such as zinc oxide is preferred. The desulfurization operation will generally take place at effective conditions including a desulfurization pressure of between about 100 and about 1000 kPa. Preferably, the desulfurization operation is carried out at a desulfurization pressure of between 200 and 300 kPa. Preferably, the desulfurization operation is carried out at a desulfurization temperature less than about 300° C., and more preferably, the desulfurization operation is carried out at a desulfurization temperature between about 50° and about 300° C. Preferably, the concentration of sulfur in the desulfurized feedstock will be less than about 10 ppm-mol, and more preferably, the concentration of sulfur in the desulfurized feedstock will be less than about 1 ppm-mol. The removal of carbon monoxide from the fuel gas sent to the fuel cell is of key importance.

Carbon monoxide poisoning of the fuel cell membranes will result in the reduction of the electrical output of the fuel cell. The catalyst of the present invention is effective in reducing carbon monoxide from feedstock concentrations ranging from about 100 to about 10,000 ppm-vol to provide a treated product stream comprising less than about 50 ppm carbon monoxide. Preferably, the treated product stream comprises between about 1 and about 50 ppm-vol carbon monoxide. More preferably, the treated product stream comprises less than about 10 ppm-vol carbon monoxide.

An essential feature of the present invention involves the use of a catalytic composite comprising a combination of catalytically effective amounts of a ruthenium component with a porous carrier material wherein the ruthenium is dispersed on the surface of the porous carrier material. Catalytically effective amounts of ruthenium metal at an effective preferential oxidation temperatures between about 70° and about 160° C. range between about 0.5 and about 10 weight percent ruthenium metal on the catalyst of the present invention. More particularly, the preferential oxidation catalyst of the present invention will contain ruthenium in amounts ranging from about 0.5 to about 5 weight percent ruthenium metal, and most particularly, the catalyst of the present invention will contain ruthenium in amounts between about 1 and about 3 weight percent ruthenium metal. Preferably, the preferential oxidation reaction will be conducted at temperatures below 160° C., and even below 140° C. Preferably, the preferential oxidation conditions include a preferential oxidation temperature between 70° and about 130° C. and a preferential oxidation pressure of between about 7 and about 250 kPa (1 to about 30 psia).

Considering first the porous carrier material utilized in the present invention, it is preferred that the material be a porous, adsorptive, high surface area support having a surface area of about 25 to about 500 $m^2/gm$. The porous carrier material should be relatively refractory to the conditions utilized in the preferential oxidation process, and it is intended to include within the scope of the present invention carrier materials which have traditionally been utilized in hydrocarbon conversion catalysts such as: (1) activated carbon, coke, or charcoal; (2) silica or silica gel, silicon carbide, clays, and silicates including those synthetically prepared and naturally occurring, which may or may not be acid treated; (3) ceramics, porcelain, crushed firebrick, bauxite; (4) refractory inorganic oxides such as alumina, titanium dioxide, zirconium dioxide, chromium oxide, zinc oxide, magnesia, thoria, boria, silica-alumina, silica-magnesia, chromia-alumina, alumina-boria, silica-zirconia, etc.; (5) crystalline aluminosilicates such as naturally occurring or synthetically prepared mordenite and/or faujasite, either in the hydrogen form or in a form which has been treated with multivalent cations; and, (6) combinations of these groups. The preferred porous carrier materials for use in the present invention are refractory inorganic oxides, with best results obtained with an alumina carrier material. Suitable alumina materials are the crystalline aluminas known as the gamma-, eta-, and theta-alumina with gamma- or eta-alumina giving best results. In addition, in some embodiments, the alumina carrier material may contain minor proportions of other well known refractory inorganic oxides such as silica, zirconia, magnesia, etc.; however, the preferred support is substantially pure gamma- or eta-alumina. Preferred carrier materials have an apparent bulk density of about 0.3 to about 0.7 gm/cc, an average pore diameter of about 20 to 3000 angstroms, a pore volume of about 0.1 to about 2.5 ml/gm, and a surface area of about 100 to about 500 $m^2/gm$.

The preferred alumina carrier material may be prepared in any suitable manner and may be synthetically prepared or naturally occurring. Whatever type of alumina is employed, it may be activated prior to use by one or more treatments including drying, calcination, steaming, etc., and it may be in a form known as activated alumina, activated alumina of commerce, porous alumina, alumina gel, etc. For example, the alumina carrier may be prepared by adding a suitable alkaline reagent, such as ammonium hydroxide to a salt of aluminum such as aluminum chloride, aluminum nitrate, etc., in an amount to form an aluminum hydroxide gel which upon drying and calcining is converted to alumina. The alumina carrier may be shaped or formed in any desired shape such as spheres, pills, cakes, extrudates, powders, granules, etc., and utilized in any desired size. By the term "shaped alumina carrier", it is meant to include shaped particles, spheres, cylinders, and irregularly shaped particles. The shaped alumina carrier will have a geometric surface and if the shaped alumina carrier is a particle, it will have a center. The alumina carrier may also be disposed as a coating on a monolith, and in such cases, the alumina carrier will have an outer surface and an inner surface where the coating is disposed on the monolith. In the present invention, the ruthenium metal is not uniformly dispersed in the alumina carrier, but is dispersed in a band extending from the surface toward the center in particles and from the surface toward the monolith when the alumina carrier is disposed on a monolith. For the purpose of illustrating present invention, a particularly preferred form of alumina is the sphere; and alumina spheres may be continuously manufactured by the well-known oil drop method which comprises forming an alumina hydrosol by any of the techniques taught in the art and preferably by reacting aluminum metal with hydrochloric acid, combining the resulting hydrosol with a suitable gelling agent and dropping the resultant mixture into an oil bath maintained at elevated temperatures. The droplets of the mixture remain in the oil bath until they set and form hydrogel spheres. The spheres are then continuously withdrawn from the oil bath and typically subjected to specific aging treatments in oil and an ammoniacal solution to further improve their physical characteristics. The resulting aged and gelled particles are then washed and dried at a relatively low temperature of about 300° F. (149° C.) to about 400° F. (204° C.) and subjected to a calcination procedure at a temperature of about 850° F. (454° C.) to about 1300° F. (704° C.) for a period of about 1 to about 20 hours. It is also a good practice to subject the calcined particles to a high temperature steam treatment in order to remove as much as possible of undesired acidic components. This manufacturing procedure effects conversion of the alumina hydrogel to the corresponding crystalline gamma-alumina. See the teachings of U.S. Pat. No. 2,620,314 for additional details.

A material characteristic of typical amorphous refractory oxide support materials employed in the preparation of catalysts is shown in U.S. Pat. No. 5,494,568 and hereby incorporated by reference. The pore size distribution of this porous carrier or refractory oxide support material is shown in Table 1 based on the pore diameter of samples determined by well-known mercury porosymmetry analysis.

TABLE 1

Carrier Pore Size Distribution

| Pore Diameter, Å | Percent of Total Pore Volume |
| --- | --- |
| 30–91 | 4.41 |
| 101–152 | 25.30 |
| 162–192 | 5.08 |
| 202–253 | 1.04 |
| 262–293 | 0.25 |
| 303–404 | 0.33 |
| 456–556 | 0 |
| 607–758 | 0 |

An unusual feature of the present invention is the character of the ruthenium metal on the porous refractory oxide carrier. It was surprisingly discovered that dispersing ruthenium metal in a band extending from the surface toward the center of a shaped alumina carrier material resulted in significant improvement in terms of CO conversion over the same shaped alumina carrier with a uniform ruthenium metal distribution throughout the alumina carrier. In comparative testing of ruthenium-containing alumina based preferential oxidation catalysts, it was discovered that the more the ruthenium was concentrated in a band near the surface of the shaped alumina carrier, the more active and more stable was the preferential oxidation catalyst.

To prepare the preferred catalyst, the support material is contacted with one or more precursors of catalytically active ruthenium metal to prepare ruthenium-containing catalyst. The ruthenium containing catalyst is then dried in air at a temperature of about 100° to about 120° C. for a period of from about 15 minutes to about 4 hours. The dried catalyst composition is purged with nitrogen and then reduced at a reduction temperature of about 200° to 500° C. in a reducing atmosphere for a period of about 0.5 to about 2 hours. Optionally, catalyst preparation steps can include an oxidation step at an elevated temperature followed by a reduction step at an elevated temperature. It is preferred to use an oxidation temperature below about 500° C., and more preferably, it is preferred to use an oxidation temperature between about 200 and about 500° C.

In the preparation of the preferential oxidation catalyst, a number of ruthenium compounds such as ruthenium nitrate, ruthenium chloride, ruthenium iodide, ruthenium chloride, and the like are useful for contacting the shaped alumina carrier material to create the catalyst of the present invention. Preferred compounds include ruthenium nitrosyl nitrate, ruthenium carbonate, etc. It is most preferred to employ ruthenium nitrosyl nitrate solution in amounts to provide an effective ruthenium content of about 0.5 up to about 10 weight percent ruthenium metal of the catalyst. More preferably, the finished preferential oxidation catalyst contains an effective amount of ruthenium equal to about 0.5 to about 5 weight percent of the catalyst as ruthenium metal, and most preferably, the finished preferential oxidation catalyst contains an effective amount of ruthenium equal to about 1.5 to about 3 weight percent of the catalyst as ruthenium metal.

The preparation of the preferential oxidation catalyst of the present invention was surprisingly influenced by controlling the pH of the ruthenium contacting solution. When no adjustment to the pH of the contacting solution was made, the ruthenium metal was dispersed uniformly throughout the shaped alumina carrier. Significant improvement in the CO conversion occurred when the pH of the ruthenium contacting solution was adjusted to a value greater than 0.0, and more particularly over a range from about 1.0 to about 4.5. As the pH of the ruthenium contacting solution was increased from about 1.0 to about 4.5, the ruthenium metal on the catalyst was dispersed preferentially in a band extending from the surface of the shaped alumina carrier toward the center. For example, in a spherically shaped alumina carrier particle, having a geometric surface and a center, there was a band extending from the surface to about 50 percent of distance toward the center of the shaped alumina carrier, and that band contained about 67 percent of the ruthenium metal dispersed on the catalyst, when the ruthenium contacting solution was adjusted to a pH of about 1.0. Essentially all of the ruthenium dispersed on the catalyst was dispersed on the catalyst in a band extending from the surface of the shaped alumina carrier toward the center when the ruthenium contacting solution was adjusted to a pH greater than about 1.0. As the pH of the ruthenium contacting solution used to contact the shaped alumina carrier was increased to about 4.5, essentially all, or at least about 98 percent, of the ruthenium metal was dispersed in a band extending from the surface to about 10 percent of the distance toward the center of the shaped alumina carrier. These observations were based on SCM and EDX analysis of the shaped alumina carrier.

The preferred ruthenium catalyst of the invention provides greater sustainable carbon monoxide conversion for an equivalent amount of ruthenium than comparative ruthenium-containing catalysts. Other physical properties of the final catalyst of the present invention include a total pore volume of about 0.1 to about 2.5 cc/gram, and preferably about 0.3 to about 1.8 cc/gram, and an apparent bulk density between about 0.2 and about 0.7, and preferably a density between about 0.2 and about 0.4 grams/cc.

The catalyst of the present invention may be employed in a finishing step in the production of a fuel gas for a fuel cell to reduce the carbon monoxide in this fuel gas and thereby minimize damage or extend the life of PEM fuel cells. Catalyst of the present invention also may be employed in any of several conversion processes including steam reforming and water gas shift processes.

Optionally, the catalyst may also contain other, additional components or mixtures thereof which act alone or in concert as catalyst modifiers to improve catalyst activity, selectivity or stability. Some well-known catalyst modifiers include antimony, arsenic, beryllium, bismuth, cadmium, calcium, chromium, cobalt, copper, gallium, gold, indium, iron, lithium, magnesium, manganese, molybdenum, nickel, potassium, rhenium, scandium, silver, sodium, tantalum, thallium, titanium, tungsten, uranium, zinc, and zirconium. These additional components may be added in any suitable manner to the carrier material during or after its preparation or they may be added in any suitable manner to the catalytic composite either before, while, or after other catalytic components are incorporated.

The invention is further illustrated by the following examples which are illustrative of specific modes of practicing the invention and are not intended as limiting the scope of the invention defined in the claims.

EXAMPLES

Example I
(pH 4.5)

A 25-cc aliquot of the alumina support as characterized in Table 1 as spheres or extrudates weighing 12.9 g was introduced into a rotary evaporator. A stock solution of ammonium hydroxide (~28 percent $NH_3$) was diluted with deionized water to a 50:50 mixture and then gradually added to a solution of 26.6 g of ruthenium (III) nitrosyl nitrate solution containing 1.5 percent ruthenium until a pH of 4.56 was reached. This solution was then added to the alumina support in a jacketed rotary evaporator. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 2–4 hours.

The impregnated catalyst was placed in a quartz tube surrounded by a ceramic-lined tube furnace and a flow of air was introduced to the tube at ambient temperature and at a flow rate of 6 L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3 L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example II
(pH 3.0)

A 25-cc aliquot of the alumina support as characterized in Table 1 as spheres or extrudates weighing 12.9 g was introduced into a rotary evaporator. A stock solution of ammonium hydroxide (~28 percent $NH_3$) was diluted with deionized water to a 50:50 mixture and then gradually added to a solution of 26.6 g of ruthenium (III) nitrosyl nitrate solution containing 1.5 percent ruthenium until a pH of 3.0 was reached. This solution was then added to the alumina support in a jacketed rotary evaporator. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 2–4 hours.

The impregnated catalyst was placed in a quartz tube surrounded by a ceramic-lined tube furnace and a flow of air was introduced to the tube at ambient temperature and at a flow rate of 6 L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3 L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example III
(pH 2.0)

A 25-cc aliquot of the alumina support as characterized in Table 1 as spheres or extrudates weighing 12.9 g was introduced into a rotary evaporator. A stock solution of ammonium hydroxide (~28 percent $NH_3$) was diluted with deionized water to a 50:50 mixture and then gradually added to a solution of 26.6 g of ruthenium (III) nitrosyl nitrate solution containing 1.5 percent ruthenium until a pH of 2.0 was reached. This solution was then added to the alumina support in a jacketed rotary evaporator. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 2–4 hours.

The impregnated catalyst was placed in a quartz tube surrounded by a ceramic-lined tube furnace and a flow of air was introduced to the tube at ambient temperature and at a flow rate of 6 L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3 L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example IV
(pH 1.0)

A 25-cc aliquot of the alumina support as characterized in Table 1 as spheres or extrudates weighing 12.9 g was introduced into a rotary evaporator. A stock solution of ammonium hydroxide (~28 percent $NH_3$) was diluted with deionized water to a 50:50 mixture and then gradually added to a solution of 26.6 g of ruthenium (III) nitrosyl nitrate solution containing 1.5 percent ruthenium until a pH of 1.0 was reached. This solution was then added to the alumina support in a jacketed rotary evaporator. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 2–4 hours.

The impregnated catalyst was placed in a quartz tube surrounded by a ceramic-lined tube furnace and a flow of air was introduced to the tube at ambient temperature and at a flow rate of 6 L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3 L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example V

A 400-cc aliquot of the alumina support as characterized in Table 1 as spheres or extrudates weighing 120 g was introduced into a rotary evaporator. A solution composed of 247 g of ruthenium (III) nitrosyl nitrate solution containing 1.5 percent ruthenium was diluted with 153 g of deionized water and added to the alumina support in a jacketed rotary evaporator. No adjustment of pH was performed. The support and solution were kept at room temperature in the rotating apparatus for about 15 minutes. Steam was introduced into the jacket of the rotary evaporator for a period sufficiently long so as to allow free-flow of the impregnated catalyst spheres (or extrudates). This period lasted for approximately 4 hours.

The impregnated catalyst was placed in a quartz tube surrounded by a ceramic-lined tube furnace and a flow of air was introduced to the tube at ambient temperature and at a flow rate of 6 L/min for a period of about 15 minutes. The temperature was raised at 5° C./min to about 110° C. and held there for about 2 hours with the same constant air flow. The air flow was shut off and a nitrogen purge was commenced at a flow rate of 1 L/min at 110° C. for 30 minutes. The nitrogen flow was terminated and a hydrogen flow was introduced over the impregnated catalyst at a rate of 3 L/min. The temperature was raised at a rate of 5° C./min to 500° C. while continuing hydrogen flow. The temperature was then maintained at 500° C. for a period of 1 hour. Hydrogen flow was stopped and nitrogen introduced as the temperature was slowly brought down to room temperature.

Example VI
(Testing Example)

Samples of the catalyst (3 ml) of Examples I–IV with nominally 3 weight percent ruthenium metal and a sample (IA) prepared according to Example I, were each separately diluted with a blank alumina support to a final volumetric ratio of 3:1 placed in a reactor and purged with nitrogen at a flow rate of 300 ml/min. The reactor was then heated to a temperature of 80° C. where the feed gas mixture shown in Table 2 was then introduced over the catalyst at a flow rate equivalent to a gas hourly space velocity (GHSV) of 5,000, 10,000, and 15,000 v/v hr$^{-1}$.

TABLE 2

| Feed Gas Over PREFOX Catalyst, Mol-% | |
| --- | --- |
| $CO_2$ | 11.98 |
| CO | 0.47 |
| $CH_4$ | 2.96 |
| Ne | 5.05 |
| $H_2$ | 46.84 |
| $N_2$ | 4.02 |
| $O_2$ | 1.06 |
| $H_2O$ | 27.62 |
| Total | 100.00 |

The reactor was heated to a temperature of about 108° C. This condition was maintained for a period of approximately 45 minutes while the effluent levels of CO, $CO_2$, $CH_4$, and $O_2$ were monitored. The temperature was lowered to 90° C. and the catalyst was maintained at this temperature for approximately 120 minutes. The catalysts of Examples I–IV (with pH adjustment) and V (with no pH adjustment) were then compared under these conditions for their ability to convert CO to $CO_2$ at space velocities ranging from about 5,000 hr$^{-1}$ to about 15,000 hr$^{-1}$ and the results are shown in Table 3. The results clearly show the advantage of the pH adjustment in terms of CO conversion for the catalyst of Examples I–IV compared to the conventionally prepared catalyst of Example V. As space velocity was increases from about 5,000 hr$^{-1}$ to about 15,000 hr$^{-1}$, the CO conversion dropped off significantly relative to the pH adjusted Examples I–IV.

TABLE 3

| | Results with 3% Ru on Alumina Base | | | | | |
| --- | --- | --- | --- | --- | --- | --- |
| Example (adjusted pH) | CO Conversion (90° C.) 5,000 hr$^{-1}$ | $O_2$ mol Selectivity to $CO_2$ (90° C.) 5,000 hr$^{-1}$ | CO Conversion (90° C.) 10,000 hr$^{-1}$ | $O_2$ mol Selectivity to $CO_2$ (90° C.) 10,000 hr$^{-1}$ | CO Conversion (90° C.) 15,000 hr$^{-1}$ | $O_2$ mol Selectivity $CO_2$ (90° C.) 15,000 hr$^{-1}$ |
| I (4.5) | 100 | 26.1 | 99.9 | 26.1 | 99.4 | 26.6 |
| II (3.0) | 99.9 | 26.5 | 89.1 | 47.8 | | |
| III (2.0) | 98.1 | 26.6 | 64.3 | 58.2 | 49.7 | 72.7 |
| IV (1.1) | 86.0 | 32.0 | 54.0 | 60.7 | 47.0 | 69.0 |
| V (none) | 43.1 | 53.4 | 12.3 | 57.1 | 6.2 | 50 |

Example VII

The catalyst materials prepared in Examples I–V were analyzed by scanning electron microscopy (SEM) and the ruthenium composition was determined within a spherical particle by energy dispersive analysis by x-rays (EDX). SEM and EDX measurements were made across the interior of the particles to determine the ruthenium distribution for the variation in the pH of the ruthenium contacting. Table 4 presents the results of this analysis as the ratio of the ruthenium metal content at any point in the particle to the average ruthenium metal content of the particle across the radius of the particle from the surface to the center of the particle. With no pH adjustment, the ruthenium was distributed essentially uniformly throughout the particle (shown as a pH of 0.0). It was surprisingly discovered that as the acidity of the ruthenium contacting solution was adjusted to increase the pH from about 1.0 to about 4.5, the performance of the prefox catalyst improved. Also observed was as the pH of the ruthenium contacting solution was increased from about 1.0 to about 4.5, the ruthenium dispersion changed from a uniform distribution to a distribution wherein the ruthenium was dispersed in a band toward the surface of the particle. Comparing the ruthenium metal content at a given point in the particle to the average ruthenium metal content of that same particle clearly illustrates this effect. For a uniform distribution profile, the ratio of the ruthenium metal content at all points across the particle to the average ruthenium metal content of the particle should be equal to one. This is clearly the case for the sample prepared using the standard ruthenium contacting solution in Example V. When the pH of the ruthenium contacting solution was adjusted to a value of 1.1 (Example IV), this ratio began to increase above 1 at a distance of approximately 500 microns from the surface of the particle. When the pH of the ruthenium contacting solution was adjusted to a value of 2.2 (Example III), this ratio began to increase above 1 at a distance of approximately 300 microns from the surface of the particle indicating a further concentration of ruthenium in a band towards the surface of the particle. When the pH of the ruthenium contacting solution was adjusted to about 3.0, the ratio increased above 1 in a band at a distance of about 200 microns from the surface of the particle towards the center, and when the pH was increased to about 4.5, the ratio increased to above 1 in a band at a distance above 100 microns from the surface towards the center. Thus, when the pH was adjusted to about 4.5, essentially all of the ruthenium metal was dispersed in a band about the outer 100 microns of the particle.

TABLE 4

Ruthenium Distribution in Impregnated 1600 Micron Spheres

| Distance from Edge, Microns | pH 4.5 Ru/Ru (avg) | pH 3.0 Ru/Ru (avg) | pH 2.2 Ru/Ru (avg) | pH 1.1 Ru/Ru (avg) | pH 0.0 Ru/Ru (avg) |
|---|---|---|---|---|---|
| 0 | 15.74 | 4.34 | 3.16 | 1.97 | 1.38 |
| 25 | 9.25 | 3.12 | 2.76 | 1.74 | 1.01 |
| 50 | 5.49 | 2.83 | 2.52 | 1.57 | 1.05 |
| 75 | 1.44 | 2.68 | 2.41 | 1.42 | 1.02 |
| 100 | 0.23 | 2.75 | 2.29 | 1.37 | 1.03 |
| 150 | 0.06 | 2.87 | 2.13 | 1.3 | 1.05 |
| 200 | 0.02 | 4.88 | 2.16 | 1.2 | 1.06 |
| 300 | 0.04 | 0.05 | 1.65 | 1.12 | 1.02 |
| 400 | 0.03 | 0.0 | 0.08 | 1.08 | 0.99 |
| 500 | 0.02 | 0.01 | 0.05 | 0.98 | 0.98 |
| 600 | 0.07 | 0.03 | 0.11 | 0.62 | 0.90 |
| 700 | 0.03 | 0.02 | 0.06 | 0.47 | 0.90 |
| 800 | 0.06 | 0.04 | 0.02 | 0.45 | 0.91 |

The FIGURE shows this trend in the transition from uniform ruthenium dispersion to surface dispersion as a function of the penetration of the ruthenium in a band extending from the surface of the particle towards the center as a percentage of the ruthenium disposed on the particle. Between the surface of the particle and a depth, or width, equivalent to about 10 percent of the radius of the particle extending from the surface towards the center of the shaped alumina carrier, and when the ruthenium contacting solution was adjusted to a pH of about 1.1 (Example IV), about 22 percent of the ruthenium metal was found therein. When the pH of the contacting solution was about 1.0 at a penetration of about 50 percent from the edge or surface of the particle, the ruthenium content in the band extending from the surface towards the center contained more than about 60 percent of the ruthenium metal dispersed on the alumina carrier particle. When the pH of the ruthenium contacting solution was adjusted to about 2.2, about 35 percent of the ruthenium metal was found in a band extending from the surface towards the center of the particle having a width of about 10 percent of the distance from the surface to the center of the shaped alumina carrier. When the pH of the ruthenium contacting solution was adjusted to about 3.0, the ruthenium metal content in a band extending from the surface toward the center within the outer 10 percent of the distance from the surface to the center of the shaped alumina particle was greater than 42 percent. When the pH of the ruthenium contacting solution was adjusted to about 4.5, essentially all of the ruthenium, or greater than about 98 percent of the ruthenium metal, was found in a band extending from the surface toward the center within the outer 10 percent of the distance from the surface to the center of the shaped alumina particle.

We claim:

1. A process for the generation of a hydrogen-rich fuel gas stream for use in a fuel cell for the generation of electric power, said process comprising:

a) passing a feed stream comprising a hydrocarbon or an oxygenate to a fuel processor comprising an integrated reforming and water gas shift conversion zone to produce a fuel stream comprising hydrogen, carbon monoxide, carbon dioxide and water;

b) passing the fuel stream at an oxidation temperature between about 70° and about 160° C. in the presence of an oxygen-containg stream to a preferential oxidation zone containing a preferential oxidation catalyst to produce the hydrogen-rich fuel gas stream comprising less than about 50 ppm-vol carbon monoxide, said preferential oxidation catalyst comprising ruthenium metal dispersed on a shaped alumina carrier, said carrier having a center and a surface, and a distance from said center to said surface at least 60 percent of the ruthenium metal being present in a band extending from the surface towards the center and having a width of about 50 percent of the distance from the surface to the center of the shaped alumina carrier; and c) passing the hydrogen-rich fuel gas stream to a fuel cell for the generation of electric power and withdrawing electric power.

2. The process of claim 1 wherein the hydrogen-rich fuel stream comprises from about 100 to about 10,000 ppm-vol carbon monoxide.

3. The process of claim 1 wherein the shaped alumina carrier has an apparent bulk density of about 0.2 to about 0.7.

4. The process of claim 1 wherein essentially all of the ruthenium metal is dispersed in the band extending from the surface towards the center of the shaped alumina carrier.

5. The process of claim 4 wherein the band extends a distance of about 10 percent between the surface and the center of the shaped alumina carrier.

6. The process of claim 1 wherein the preferential oxidation catalyst comprises ruthenium metal in the amount of 0.5. to about 10 weight percent of said catalyst.

7. The process of claim 1 wherein the preferential oxidation catalyst comprises ruthenium metal in the amount of about 0.5 to about 3 weight percent of said catalyst.

8. The process of claim 1 wherein the oxidation temperature ranges between about 70° and about 130° C.

9. The process of claim 1 wherein the shaped alumina carrier comprises a pore volume from about 0.1 to about 2.5 milliliters/gram.

10. A preferential oxidation process for the conversion of carbon monoxide comprising passing a fuel stream comprising hydrogen, carbon monoxide, carbon dioxide and water in the presence of an oxygen-containing stream at oxidation conditions including a preferential oxidation temperature less than about 160° C. to a preferential oxidation zone containing a preferential oxidation catalyst comprising ruthenium metal dispersed on a shaped alumina carrier, said carrier having a center and a surface, and a distance from said center to said surface at least 60 percent of the ruthenium metal being present in a band extending from the surface towards the center and having a width of about 50 percent of the distance from the surface to the center of the shaped alumina carrier, and withdrawing a treated fuel stream comprising less than about 50 ppm-vol carbon monoxide.

* * * * *